July 14, 1953  W. F. HINDERER  2,645,067
WORKTABLE WITH SINE-BAR FEATURE
Filed June 9, 1950
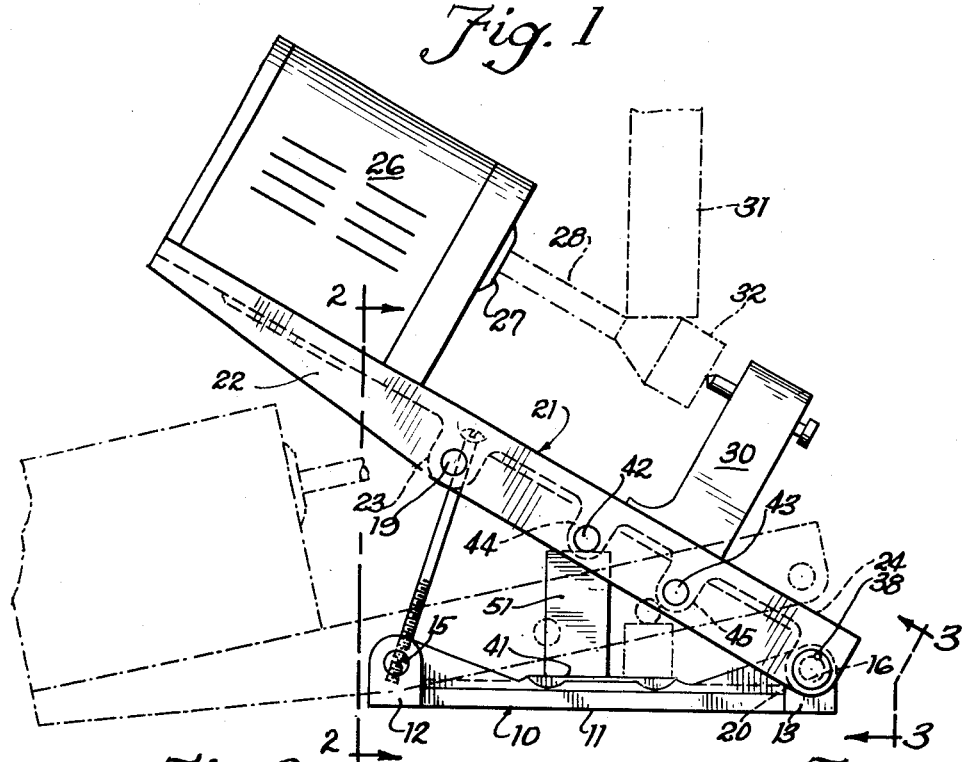
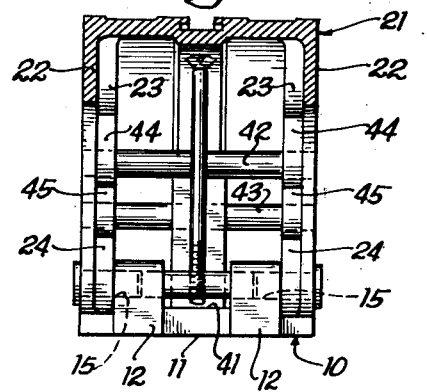
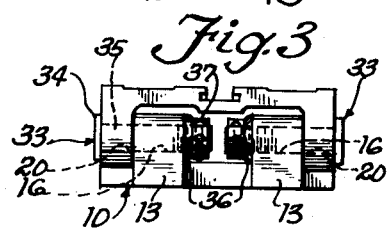
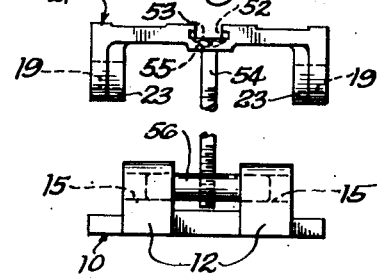
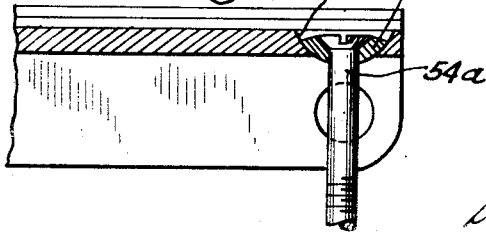
INVENTOR.
Walter F. Hinderer

UNITED STATES PATENT OFFICE 2,645,067

WORKTABLE WITH SINE-BAR FEATURE

Walter F. Hinderer, Kankakee, Ill.

Application June 9, 1950, Serial No. 167,078

1 Claim. (Cl. 51—237)

This invention relates to a work table for attachment to the table of a grinding machine or the like as employed in machine shops. Specifically it has reference to a device for supporting work piece on a support which is angularly adjustable with respect to the normally horizontal work table of the machine.

Devices of the foregoing character are well-known, and comprise a bed plate or base securable to the table of the grinding machine by bolts or the force of a magnetic chuck and to which a support is pivotally connected. Means in the form of centers or a chuck are provided on the support for holding the work piece, which may therefore be disposed at desired angles to the grinding wheel axis. Frequently the angular setting is attained with the aid of a sine-bar set up arranged by the use of various expedients.

The sine-bar method of producing angular positioning of one member with respect to another involves the proposition that the sine function of an angle is the quotient of the length of the side opposite the angle divided by the length of the hypothenuse (the triangle being right-angled). Accordingly by using a constant length of hypothenuse and a vertical spacer of selected height the tiltable member may be set at a predetermined angle with reference to a fiducial surface. Various modes of relating the hypothenuse (sine-bar) to the spacer and surface are in use. For an example, reference is made to Machinery's Handbook, Fifth Edition, page 892.

However to obtain rapid and accurate settings of an adjustable work support with respect to a horizontal or other reference plane the use of an independent sine-bar arrangement is cumbersome and unreliable. Accordingly a principal object of my invention is the provision of a work-piece holding attachment which is angularly adjustable and settable by means of an integral sine-bar feature.

Another object is to provide an angularly adjustable support which is capable of being tilted selectively about either of a pair of parallel axes, and incorporates an integral sine-bar feature usable without relocation of parts regardless of the axis then selected.

Still another object involves an attachment in accordance with the foregoing which includes means for reliably maintaining a predetermined angular setting during the progress of the work.

Generally regarded the invention comprises a base having two sets of apertures, one at each end thereof, and a table having apertures therein arranged to be mated selectively with said sets of apertures. The parts are arranged for registry of selected mating apertures, and pivot bolts are passed therethrough for providing an angular setting of the table with respect to the base about one or the other pivotal axes. The table carries means for supporting a work piece thereon, and is provided on its underside with a pair of integral rods having a cylindrical or semi-cylindrical surface for abutment against the top of a gauge block resting upon a fiducial surface of the base, and whereby the sine function of a desired angle is achieved. Means are provided for rigidly securing the table and gauge-block with respect to the base.

In the drawing which shows one form in which the invention may be embodied in practice:

Fig. 1 shows a side-elevational view of the invention attachment in one of its operating positions, and in phantom, opposite operating position;

Fig. 2 is a cross-sectional view taken on the line 2—2 of Fig. 1;

Fig. 3 is an end elevation; viewed in the direction of the arrows 3—3;

Fig. 4 is a detail view showing the hold-down means; and

Fig. 5 is a detail view of a modified form of hold-down means.

Referring to the several figures the attachment comprises a base 10 of rectangular form having a flat bottom surface 11 adapted to be secured in any convenient manner to the table of the grinding machine or other tool (not shown). Inasmuch as the work table, particularly in the case of a grinding machine, is provided with a magnetic chuck the example herein contemplates that mode of securement.

At each end of the base 10 there is a pair of upstanding ears 12—12 and 13—13 through which there are coaxial ground cylindrical apertures 15—15 and 16—16 respectively for the reception of pivots to be described.

Arranged to be pivoted about the axis of a pair of related apertures is the table or support 21 of rectangular form and having marginal reinforcing ribs 22—22 with which pairs of transversely aligned bosses 23—23 and 24—24 are merged, and which latter are provided with apertures 19—19 and 20—20 for registry with apertures 15—15 and 16—16.

Table 21 is arranged for angular adjustment about either the axis of the apertures 15—15 or 16—16, the latter being that in use in Fig. 1, and the other selectable position being indicated in phantom. Table 21 carries a work-piece holding and rotating means indicated generally at 26, which may comprise an electric motor arranged through gearing or a belt and pulleys to rotate a chuck, e. g. a collet 27, in which the work piece 28 is held. If desired a tail stock and dead center 30 may be employed, as will be understood.

The grinding wheel of the machine is shown at 31, the setting of the attachment being such as to result in grinding of the conical surface 32 of the work piece, and the slope of the surface being the angular setting of the attachment. Assuming that the surface sloped oppositely to that shown the attachment would be set up with the axis of the apertures 15—15 in use.

Selective setting on one pivotal axis or the other is achieved by means of a pair of pivot pins or bolts 33—33, best seen in Fig. 3, these having a head 34 and ground shank 35, and provided with a washer 36 and ring nut 37, the radial apertures of the latter permitting the use of a key or spanner for rigid securement of the base and table after the required angle has been determined. To forestall rotation of the bolt during tightening of the nut the same may be provided with a dowel 38 entering a corresponding aperture in a rib 22. It will be comprehended that to insure accuracy the shank 35 of each bolt 33 is ground to a close fit with the mating aperture, and that pivots 33—33 are interchangeable between apertures 15—15 and 16—16, as well as between apertures 19—19 and 20—20.

For accomplishing an exact angular setting the sine-bar feature heretofore referred to is incorporated as an integral part of the attachment. To this end the base 10 is provided with a fiducial surface 41 and the table 21 with a pair of fixed transverse rods 42 and 43 secured at their ends in bosses 44—44 and 45—45 in any convenient manner. Rods 42 and 43 are shown as cylindrical but may be of other form provided that at least the lower half is semi-cylindrical.

The spacing longitudinally of the table 21 of the axes of the pin 42 and apertures 20—20 on the one hand, and of the pin 43 and apertures 19—19 on the other hand is equal, and, in the example, is 5″ in order to provide the hypothenuse of the reference triangle. Similarly the fiducial surface or pad 41 (if produced) is tangential to the periphery of the pivots 33—33 to provide a base for the triangle. The side opposite the angle of the reference triangle which, by virtue of its length, fixes the magnitude of the angle, is determined by a gauge block 51 of length equal to that side. To permit a direct setting of this character the radius of the rods 42 and 43 and of the pivots 33—33 are equal. Thus, assuming the availability of a sine-bar setting chart based on a hypothenuse of 5″ (and this is the usual standard) the vertical distance so read therefrom merely requires selection of a gauge block or blocks equal to that distance. Accordingly the angular setting is direct; no special computation is required; and the use of ground parts in the attachment together with gauge blocks of the standard type insures great accuracy and a setting that is rapidly reproducible if the set-up has been changed.

By "gauge blocks" I refer to those of the Johannsen or Webber type, although any other accurate standard may be deemed equivalent.

By employing perfectly cylindrical rods 42 and 43 which have a surface uninterrupted by fastening means or apertures therefor great accuracy in producing the rods is possible. Hardening of a rod having a uniform transverse cross section throughout is simplified. Moreover grinding of a cylindrical surface interrupted by counterbores and other apertures is apt to result in a part sufficiently out of round to prevent its use in a sine bar attachment. The invention rod is characterized by having an uninterrupted cylindrical surface for abutment with the gauge blocks.

While the pivot bolts 33—33 will provide sufficient rigidity for many purposes it may often be desirable to supplement that action by additional hold-down means now to be described.

Consequently at each end of the table 21 (Fig. 4) I provide a seat 52 of spherical radius for receiving a correspondingly contoured head 53 of a screw 54, the shank of the screw passing through a clearance aperture 55 in the table. A cylindrical pin 56 is transversely threaded at its midpoint to receive the screw 54, and is placed in the set of apertures 15—15 or 16—16 not then occupied by the pivots 33—33. In this connection it will be understood that the pin 56 is a snug, but sliding, fit in the apertures. Inasmuch as accurate axial positioning of pin 56 would be difficult to achieve without additional complication, the pin is located optically as closely as possible to center, and any slight misalignment transversely is accommodated by means of the head 53 of the screw 54 rotating on the seat 52. Without such freedom on the part of the screw tightening thereof would tend to twist the table 21 upon its pivotal axis, and with consequent inaccuracy in the table setting.

As an alternative to the foregoing hold-down means, I may utilize the construction of Fig. 5 in which the screw 54a is of standard flat head form and is received on a washer 57 having a countersunk hole for the screwhead, and a lower face of spherical radius to mate with the seat 52.

While I have shown particular embodiments of my invention, it will be understood, of course, that I do not wish to be limited thereto since many modifications may be made, and I therefore contemplate by the appended claim to cover any such modifications as fall within the true spirit and scope of my invention.

Having thus described my invention, what I claim and desire to secure by Letters Patent is:

An attachment for a machine tool for supporting a work-piece during machining thereof comprising a rectangular base for securement to the tool and a rectangular table for angular adjustment relatively to said base, a pair of laterally spaced first ears upstanding from said base at each end thereof, a pair of laterally spaced second ears extending downwardly from each end of said table and in face-to-face relation with corresponding ones of said first ears to maintain lateral relation of said table and base, each of a pair of juxtaposed ears having aligned bores, removable pivots adapted to be placed selectively in one or the other of the pairs of bores at one end of the attachment for relative pivotal movement of said table and base, two pairs of laterally spaced third ears extending downwardly from said table and intermediate said pairs of second ears, a cylindrical rod secured in the laterally-opposite ones of each pair of third ears, said base having a fiducial surface of supporting conventional gauge blocks intermediate said surface and that one of said rods most remote from the said pivots to determine a desired angle of said table, a cylindrical rod adapted to be inserted in the bores of said pair of first ears not then occupied by the pivots, said table having a pair of apertures through the flatwise extent thereof and at each end thereof, the upper end of the apertures having a spherically-contoured countersink, and a screw through that table aperture remote from the pivoted end thereof having a correspondingly spherically-contoured head seated in the aperture and threadedly engaged in said last rod intermediate the ears within which the last mentioned cylindrical rod is associated for anchoring the table against the gauge blocks, and work-holding means mounted on said table.

WALTER F. HINDERER.

References Cited in the file of this patent

UNITED STATES PATENTS

| Number | Name | Date |
|---|---|---|
| 1,073,487 | Hinds et al. | Sept. 16, 1913 |
| 1,308,451 | Schachat | July 1, 1919 |
| 1,428,509 | Weingar | Sept. 5, 1922 |
| 1,551,995 | Levenston | Sept. 1, 1925 |
| 1,931,730 | Klay | Oct. 24, 1933 |
| 2,014,156 | Verderber et al. | Sept. 10, 1935 |
| 2,111,299 | Robbins | Mar. 15, 1938 |
| 2,428,248 | Strong | Sept. 30, 1947 |

FOREIGN PATENTS

| Number | Country | Date |
|---|---|---|
| 111,183 | Great Britain | Nov. 22, 1917 |

OTHER REFERENCES

American Machinist, July 31, 1930, page 213.